(12) United States Patent
Harris et al.

(10) Patent No.: US 11,505,385 B2
(45) Date of Patent: Nov. 22, 2022

(54) SELF-SEALING BAG

(71) Applicant: Hoffer Plastics Corporation, South Elgin, IL (US)

(72) Inventors: James Harris, South Elgin, IL (US); Brian Beringer, South Elgin, IL (US)

(73) Assignee: Hoffer Plastics Corporation, South Elgin, IL (US)

( * ) Notice: Subject to any disclaimer, the term of this patent is extended or adjusted under 35 U.S.C. 154(b) by 0 days.

(21) Appl. No.: 17/242,544

(22) Filed: Apr. 28, 2021

(65) Prior Publication Data

US 2022/0073249 A1 Mar. 10, 2022

Related U.S. Application Data

(60) Provisional application No. 63/075,463, filed on Sep. 8, 2020.

(51) Int. Cl.
| | | |
|---|---|---|
| *B65D 77/06* | (2006.01) | |
| *F16L 29/04* | (2006.01) | |
| *B67D 7/02* | (2010.01) | |

(52) U.S. Cl.
CPC ......... *B65D 77/067* (2013.01); *B67D 7/0294* (2013.01); *F16L 29/04* (2013.01)

(58) Field of Classification Search
CPC ..... B67D 1/0835; B67D 7/0294; F16L 37/32; F16L 37/44; F16L 29/04; Y10T 137/87957; B65D 77/067
See application file for complete search history.

(56) References Cited

U.S. PATENT DOCUMENTS

| | | | | |
|---|---|---|---|---|
| 5,697,410 A | * | 12/1997 | Rutter | B67D 3/043 |
| | | | | 141/354 |
| 6,347,785 B1 | * | 2/2002 | Copp | B65D 77/067 |
| | | | | 137/614.04 |
| 10,301,088 B1 | * | 5/2019 | Laible | B01F 23/00 |
| 2009/0090745 A1 | * | 4/2009 | Forbis | B65D 25/48 |
| | | | | 222/509 |

* cited by examiner

*Primary Examiner* — Vishal Pancholi
*Assistant Examiner* — Robert K Nichols, II
(74) *Attorney, Agent, or Firm* — Knechtel, Demeur & Samlan

(57) ABSTRACT

An improved biasing spring mechanism for the valve poppet of the self-sealing valve disposed in the bag fitment of a beverage dispensing collapsible bag. A singular integrally formed spring mechanism and valve poppet replaces the two-piece embodiment previously employed for the self-sealing valve. A u-shaped channel on the poppet receives the valve seat in the coupling to seal off the flow of liquid when the poppet is pushed into the closed position. A plurality of petaloid segments connect the poppet to a circumferential ring surrounding the petaloid segments and provide a spring force to the poppet to move the poppet between the open and closed positions.

2 Claims, 7 Drawing Sheets

SELF-SEALING BAG

CROSS REFERENCE TO RELATED APPLICATION

This application is based on and claims priority of provisional patent application 63/075,463 filed Sep. 8, 2020.

BACKGROUND AND SUMMARY OF THE INVENTION

This invention relates to an improvement in a self-sealing valve assembly for use with a quick-disconnect coupling in a bag-in-a-box syrup dispensing assembly of a post-mix beverage dispenser. A self-sealing bag valve is disclosed in U.S. Pat. No. 5,477,883 (the '883 Patent") invented by Kevin Totten and assigned to The Coca-Cola Company, which patent in its entirety is incorporated herein by reference. This invention is directed to an improvement in the valve assembly illustrated in the '883 Patent. Accordingly, the background of the invention, and its general operation will not be duplicated herein as they are disclosed in the '883 Patent. Rather this application will focus on the improvements to the valve assembly.

The '883 Patent is directed to an improved biasing spring mechanism for the valve poppet of the self-sealing valve disposed in the bag fitment of a collapsible bag, such as illustrated in FIGS. 1 and 10 of the '883 Patent. Although the plastic spring was an improvement over the other spring mechanisms in the prior art, there was still room for further improvement. Applicant's invention is directed to an improvement in the spring mechanism and valve poppet, which replaces the prior art two-piece embodiment with a single piece with improved operation and performance.

BRIEF DESCRIPTION OF THE DRAWINGS

For ease of following the description of the invention, where drawings from the prior art '883 Patent are used to describe the parts in the '883 Patent, the same figure and parts numbers will be used herein. However, new part numbers will be assigned to new parts in the inventive design.

DESCRIPTION OF THE PREFERRED EMBODIMENT

Figure 1:
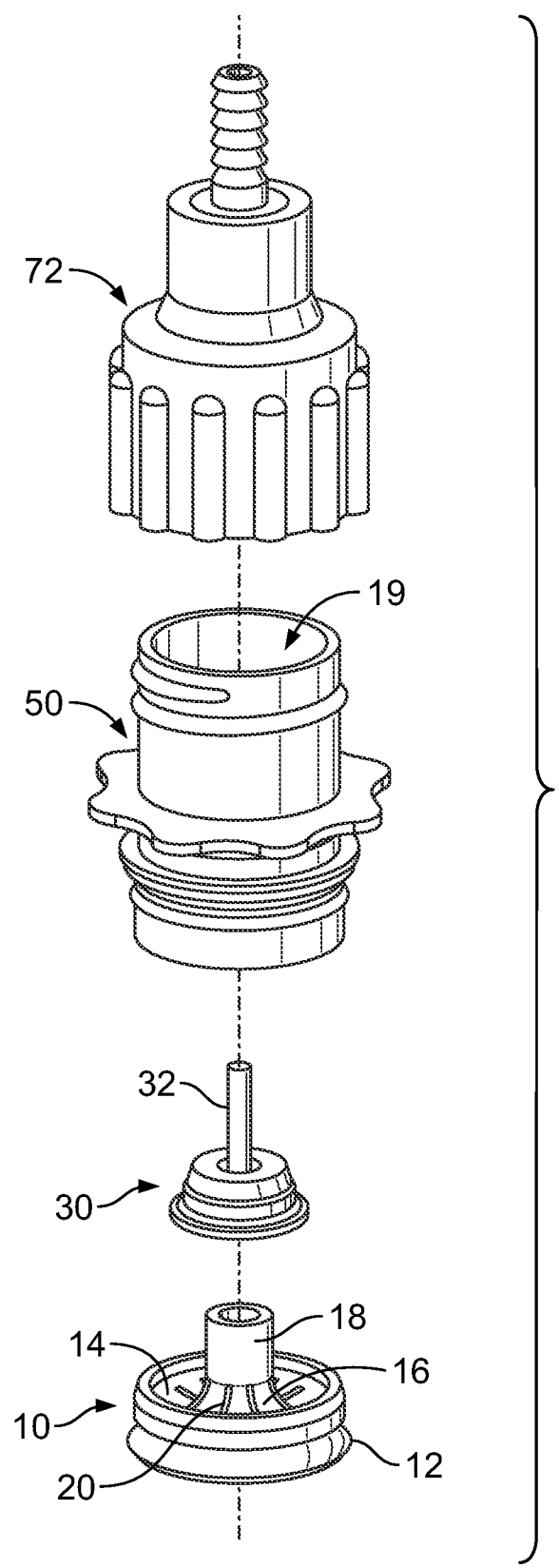
FIG. 1 is FIG. 1 of the prior art '883 Patent illustrating an exploded view of the prior coupling member, self-sealing valve housing, and a poppet and spring assembly.

Turning to FIG. 1, there is illustrated an exploded view of the prior designed quick disconnect coupling 72, that is comprised of a self-sealing valve housing 50, a poppet 30 and biasing spring 10. As can be seen, there the valve poppet 30 has an upstanding stem 32. The biasing spring 10 provides a biasing spring force to the poppet 30. The biasing spring 10 is comprised of a retaining ring 12 which is secured to a petaloid-shaped disc having a first frusto-conical shaped portion 14 and a second frusto-conical shaped portion 16 joined at a circular termination line 17 forming a flexible joint. The second frusto-conical shaped portions are connected at their tops to a petaloid stem 18. There is a central bore 19 to allow the flow of liquid through the valve housing 50 which is fully described in the '883 Patent and incorporated herein in its entirety.

Figure 2:
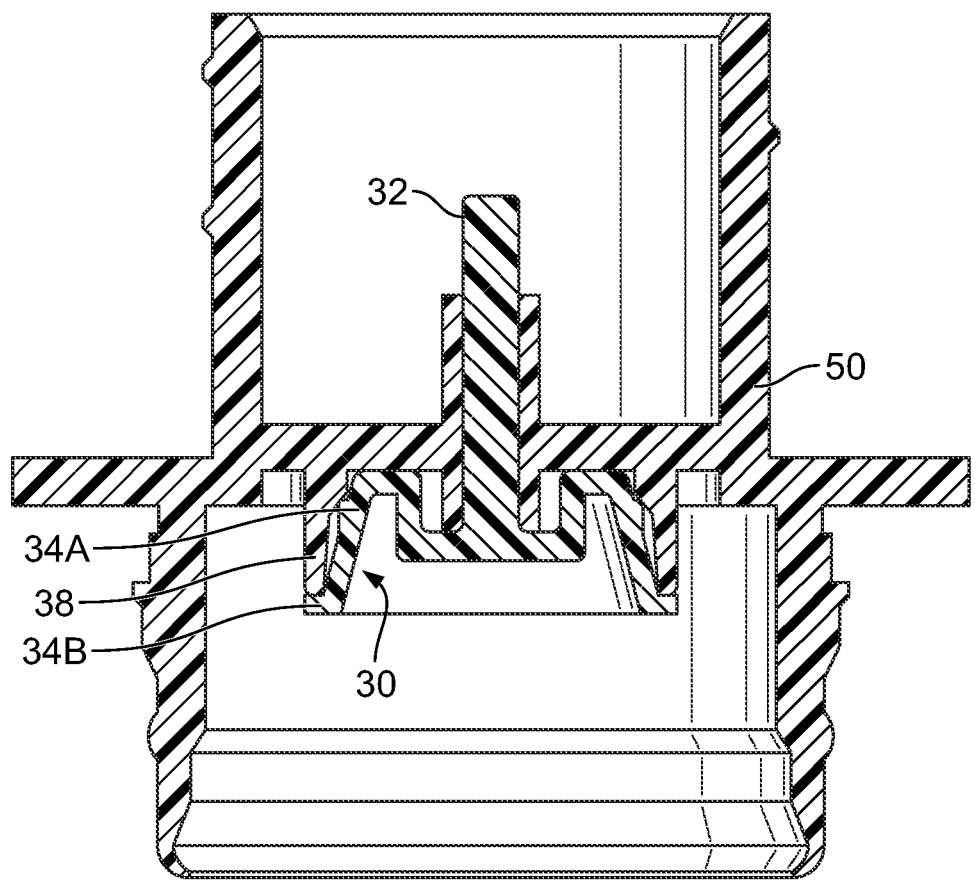
FIG. 2 is FIG. 6 of the prior art '883 Patent illustrating a cross sectional view of the valve housing with the poppet mounted in the housing in the closed position.
Figure 3:
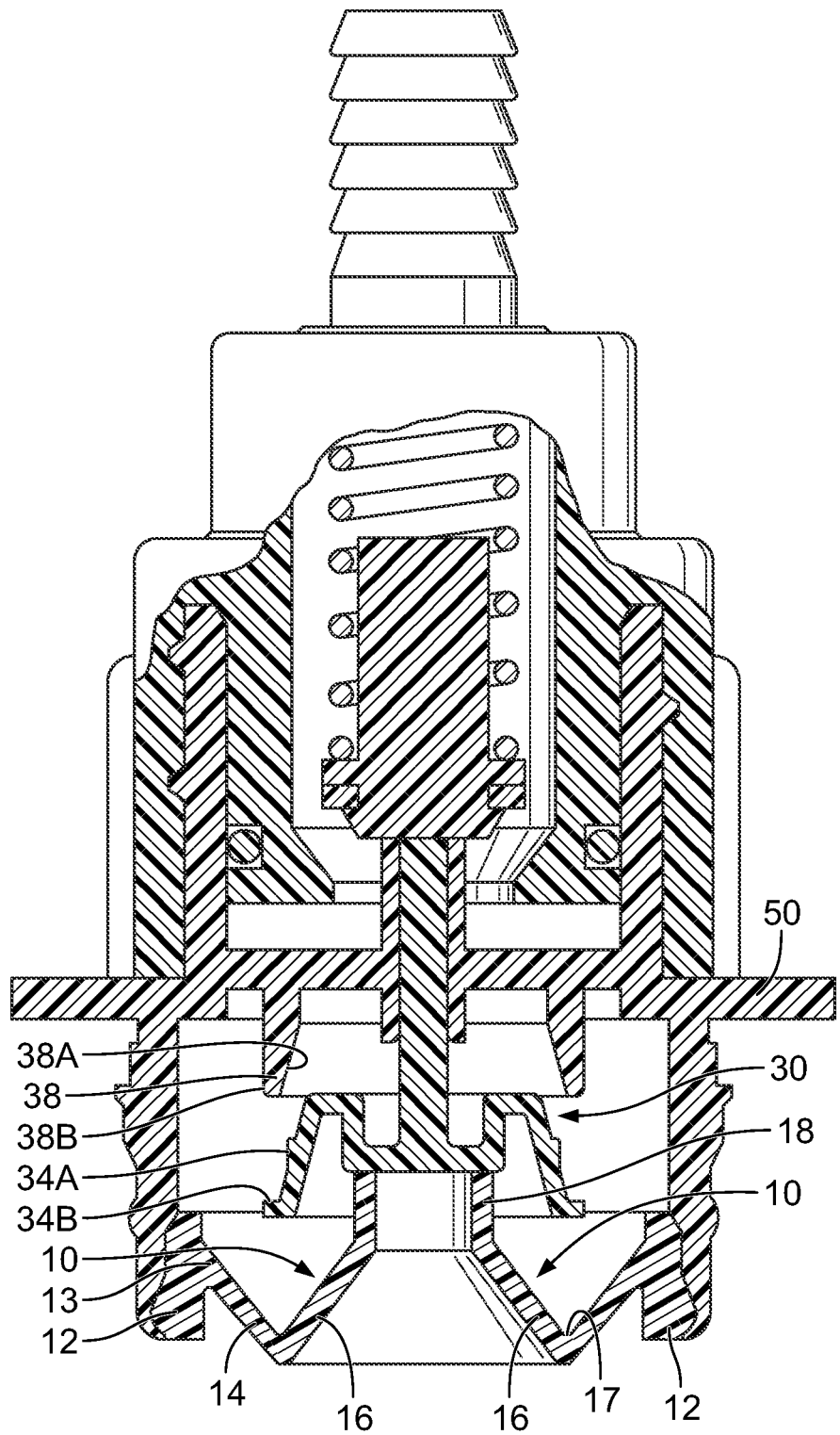
FIG. 3 is FIG. 7 of the prior art '883 Patent illustrating a cross sectional view of the quick-disconnect coupling showing the valve poppet in the open position.

FIG. 2 of the prior art illustrates the valve and poppet 30 in the closed position so that fluid will not flow past the poppet 30. The poppet 30 has a sealing shoulder 34A and peripheral flange 34B that provide sealing with a surrounding valve seat 38, its tapered inner wall 38A and its bottom end 38B (see FIG. 3). Although not illustrated, in FIG. 2, the biasing spring 10 and the first and second frusto-conical portions 14, 16 are in the compression state which apply the force to the poppet 30 so that it assumes the illustrated closed position. When the valve is in the open position, as seen in FIG. 3, the biasing spring 10 and the first and second frusto-conical portions 14, 16 are in the relaxed state. Also, it is seen in FIG. 3 that the first frusto-conical portion 14 is attached to the ring 12 below the top of the ring 12 and near the center of the height of the ring 12 at location 13.

Figure 4:
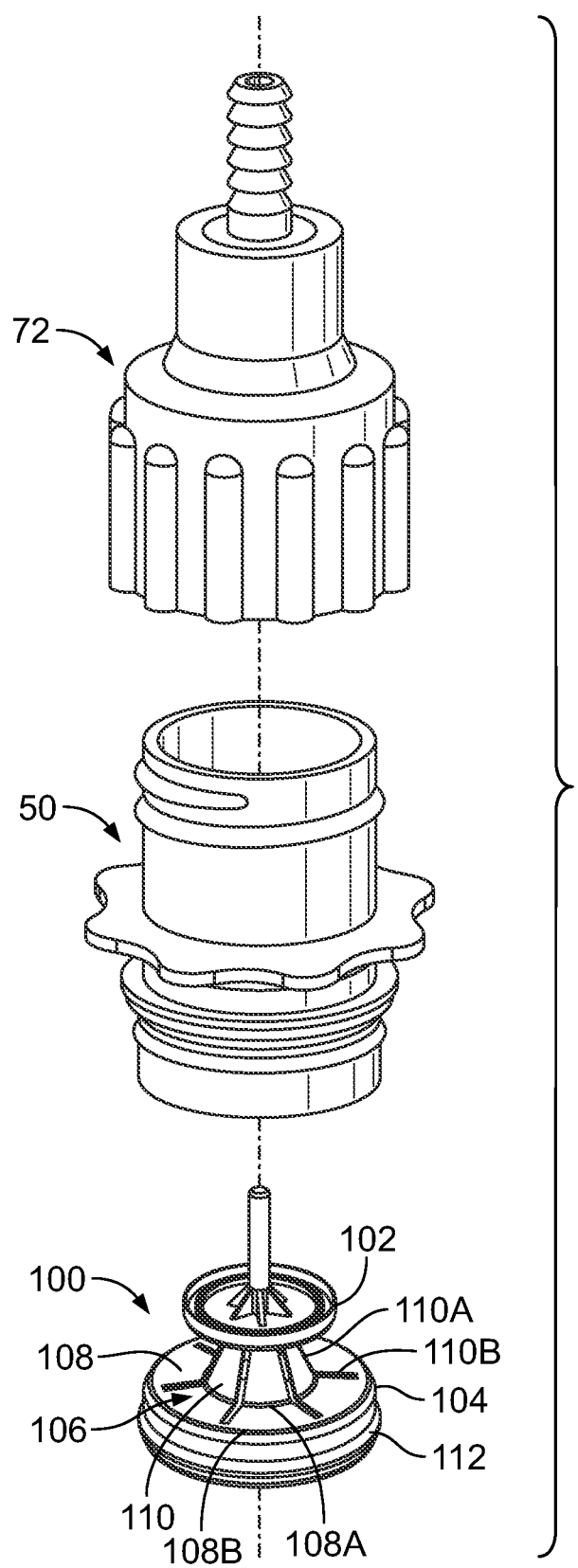
FIG. 4 is an exploded view of the coupling member, self-sealing valve housing, and the inventive poppet and spring assembly.

Applicant's improved valve provides an improved combination poppet and biasing spring design 100. Turning to FIG. 4, the improved valve design is illustrated. A poppet 102 and spring 104 and are now formed as a one-piece combination assembly 100. The spring 104 has a plurality of petaloids 106 that are formed from first petaloid segments 108 and second petaloid segments 110. The first petaloid segments have interior proximal ends 108A and exterior distal ends 108B. The second petaloid segments also have interior proximal ends 110A and exterior distal ends 110B. The interior proximal end 108A of the first petaloid segment is joined to the exterior distal end 110B of the second petaloid segment at circular termination line 17 as in the '883 Patent. There is a circumferential retaining ring 112 at the base of the spring 104 which snap couples the spring 104 into the valve housing 50, as similar to the embodiment illustrated in the '883 Patent.

Figure 5:
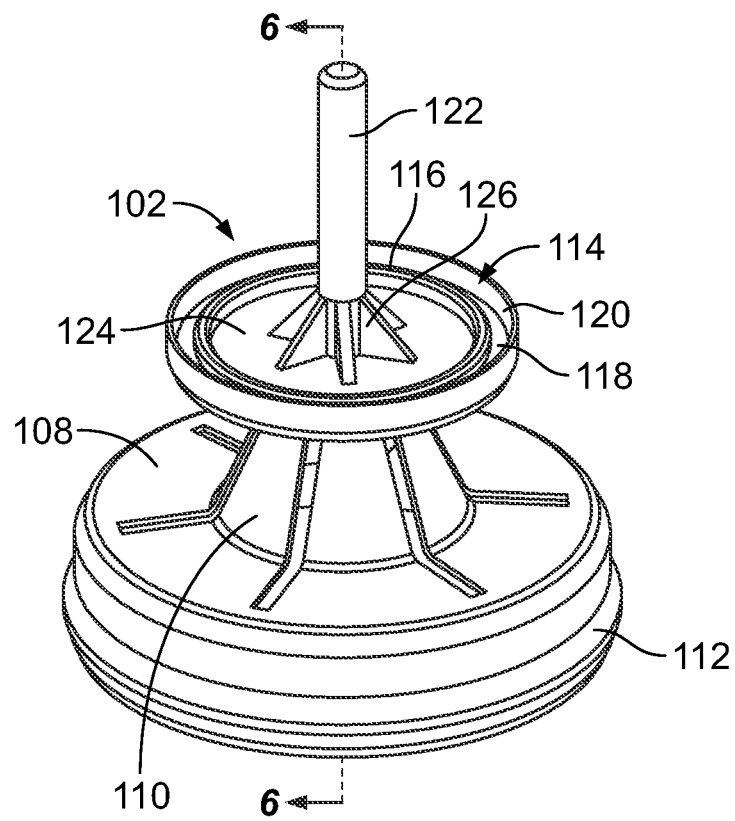
FIG. 5 is a perspective view of the inventive one-piece poppet and spring.
Figure 6:
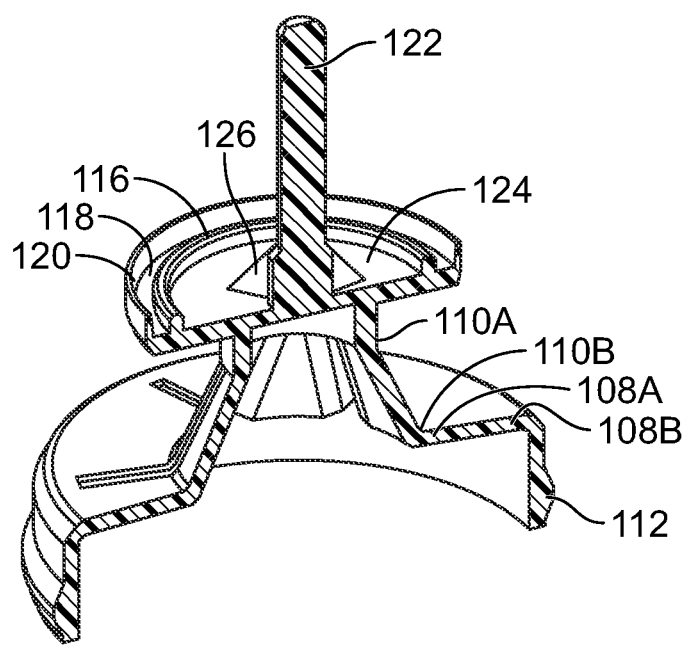
FIG. 6 is a cross section view of the one-piece poppet and spring of FIG. 5 taken along line 6-6 of FIG. 5.

As seen in FIGS. 5 and 6, the poppet 102 has a u-shaped circumferential channel 114 that is formed from an inner wall 116, bottom 118, and outer wall 120. There is a valve stem 122 that is mounted in the housing 50 so that is reciprocates up and down during operation of opening and closing of the valve in its normal manner. The valve stem 122 is attached to a base 124 of the poppet 102. As seen in FIG. 5, a plurality of gussets 126 are attached between the valve stem 122 and base 124 for added support and structural strength when attaching the valve stem 122 to the base 124.

FIGS. 7-10 clearly illustrate the improvements in the valve design over the sealing mechanism of the '883 Patent.

Figure 7:
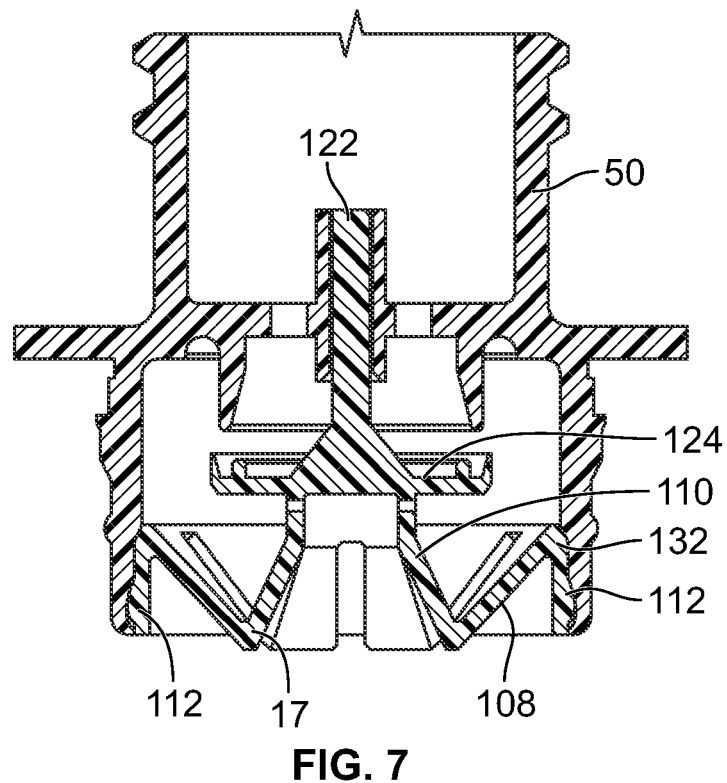
FIG. 7 is a cross sectional view of the valve housing and the one-piece poppet and spring assembly in the open position.
Figure 9:
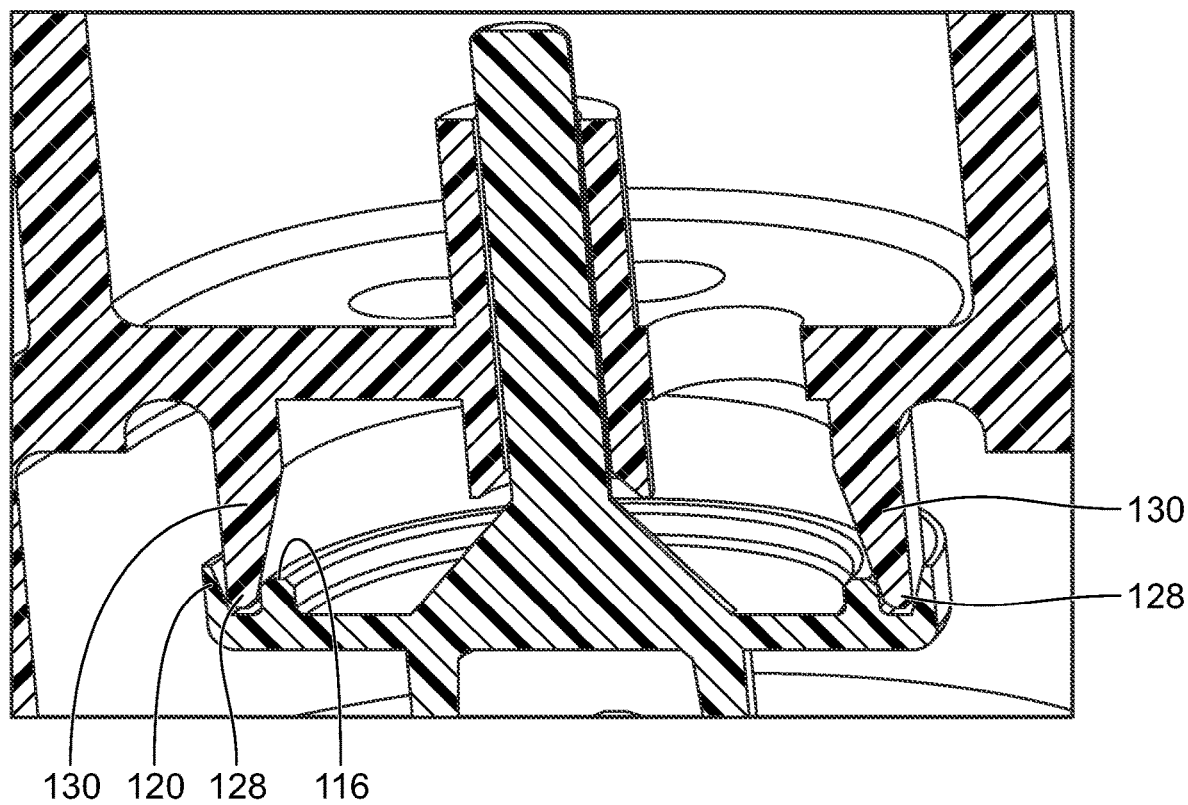
FIG. 9 is an enlarged, cross sectional view of the bottom of the chamfer of the poppet in the closed position illustrating the improved sealing mechanism.

As seen in FIGS. 6 and 7 of the 883 Patent, the valve poppet 30 has a sealing shoulder 34A and a peripheral flange 34B that seal in the closed position with the valve seat 38. Applicant's improved design provides the u-shaped channel 114 that seals at a bottom chamfer 128 of a valve seat 130 as seen in FIG. 9. This provides a triple seal comprised of a seal between the outer wall 120 and the chamfer 128, between the bottom 118 and bottom chamfer 128, and between the inner wall 116 and bottom chamfer 128.

Figure 8:
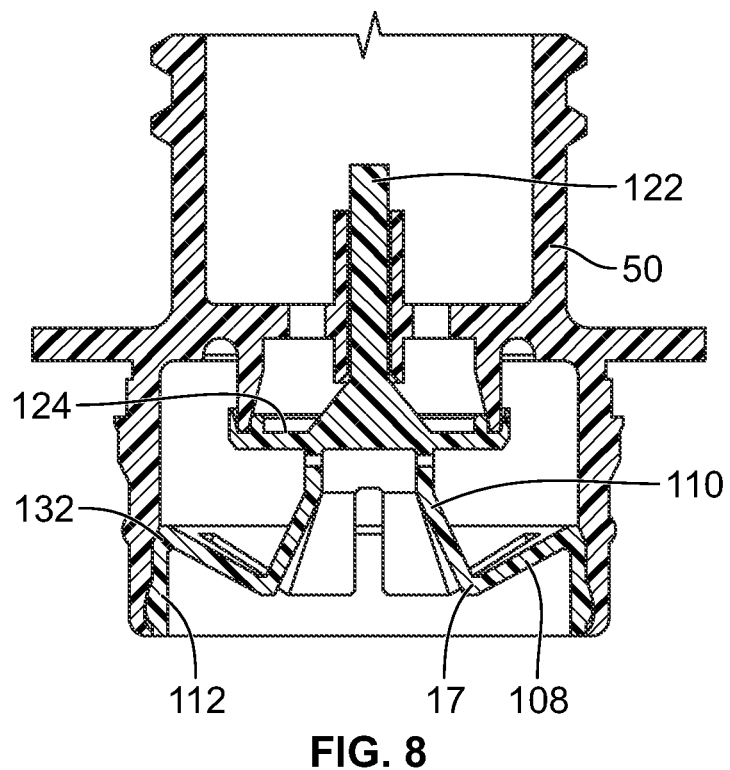
FIG. 8 is a cross sectional view of the valve housing and the one-piece poppet and spring assembly in the closed position.

Furthermore, the plurality of gussets 126 between the valve stem 122 and base 124 provide additional strength to the poppet 102 to retain its shape and sealing capabilities through numerous operations. Also, it is seen in FIGS. 7 and 8 that the exterior distal ends 108B of the first petaloid segments 108 are attached to the retaining ring 112 near the top of the ring 112 at location 132. Placing the point of connection of the exterior distal ends 108B of the first petaloid segment 108 at the top of the retaining ring 112 provides increased spring pressure applied to the poppet 102 which increases the pressure on the base 124 and u-shaped channel 114 when the valve is in the closed and sealed position as seen in FIG. 8. Thus, the sealing of the valve is improved. An additional benefit of the improved poppet and spring 100 is that it is manufactured as a singular integrally molded poppet and biasing spring, which eliminates one of the parts of the prior design illustrated in the '883 Patent. Thus, reduced cost, an improved design that is structurally superior, and elimination of one of the prior art parts is achieved.

Thus, there has been provided an improved self-sealing valve assembly for use with a quick-disconnect coupling in a bag-in-a-box syrup dispensing assembly. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A self-sealing bag valve comprising:
    a housing having first and second open ends connected by a central bore;
    a valve seat disposed within the central bore;
    a singular combined valve poppet and spring means, the valve poppet moveable into and out of sealing engagement with the valve seat to open or close the valve, the valve poppet having a centrally mounted valve stem and having a planar disc with a top surface and a bottom surface, the top surface of the planar disc having a u-shaped channel disposed around the circumference of the planar disc, the u-shaped channel having an inner wall, an outer wall, a bottom, and an open top the open top of the u-shaped channel receiving in sealing engagement the valve seat along the inner wall, the outer wall, and the bottom when the valve is closed,
    the spring means normally biasing the poppet into and out of sealing engagement with the valve seat, the spring means comprising:
    a petaloid-shaped disc having spaced petaloid segments defining flow passages therebetween, the petaloid segments having a centralized end and a peripheral end, the petaloid segments are comprised of a first petaloid segment and a second petaloid segment, the first petaloid segment having a first petaloid segment interior proximal end and a first petaloid segment exterior distal end the second petaloid segment having a second petaloid segment interior end and a second petaloid segment distal end, with the first petaloid segment exterior distal end connected to the second petaloid segment interior end along a termination line providing a, joint about which the first and second petaloid segments can flex for providing a spring force to the underside of the valve poppet,
    an outer circumferential ring having a top portion and a bottom portion, and wherein the first petaloid segment exterior distal end is connected to the top portion of the outer circumferential ring,
    the centralized ends of the petaloid segments integrally connected to the bottom surface of the valve poppet,
    whereby movement of the poppet causes flexing of the petaloid segments.

2. The self-sealing bag valve of claim 1 and further comprising a plurality of supporting gussets mounted between the top surface of the valve poppet and the valve stem.

* * * * *